United States Patent [19]

Fuller

[11] Patent Number: 5,555,786
[45] Date of Patent: Sep. 17, 1996

[54] ROTARY PRESS CUTTERS

[75] Inventor: Roy W. Fuller, Leicester, United Kingdom

[73] Assignee: Magnaflex Systems Limited, Great Britain

[21] Appl. No.: 196,698

[22] Filed: Feb. 15, 1994

Related U.S. Application Data

[63] Continuation-in-part of Ser. No. 8,617, Jan. 22, 1993, abandoned.

[51] Int. Cl.⁶ ................ B26D 7/26; B26D 1/62; B31B 1/20
[52] U.S. Cl. .............. 83/663; 83/346; 83/667; 83/669; 83/698.21; 83/698.42; 83/911; 493/362; 493/363; 493/369; 493/370
[58] Field of Search .............. 83/332, 343, 659, 83/665, 669, 670, 698.21, 698.42, 667, 911, 346, 663; 76/107.8; 101/226, 389.1; 493/354, 365, 361, 362, 363, 369, 370

[56] References Cited

U.S. PATENT DOCUMENTS

| | | | |
|---|---|---|---|
| 1,618,191 | 2/1927 | Hemberger | 83/698.41 X |
| 3,244,335 | 4/1966 | Downie | 83/880 |
| 3,460,443 | 8/1969 | Sarka et al. | 493/354 |
| 3,578,761 | 5/1971 | Sarka | 83/698.42 X |
| 3,824,926 | 7/1974 | Fukuyama | 101/389.1 X |
| 4,402,265 | 9/1983 | Pickard | 101/389.1 |
| 4,537,588 | 8/1985 | Ehlscheid et al. | 83/152 X |
| 4,625,928 | 12/1986 | Peekna | 101/389.1 X |
| 4,676,161 | 6/1987 | Peekna | 101/389.1 X |
| 4,823,659 | 4/1989 | Falasconi | 83/698.41 X |
| 4,823,697 | 4/1989 | Randazzo | 101/389.1 X |
| 4,831,930 | 5/1989 | Leanna | 101/389.1 |
| 5,373,758 | 12/1994 | Gerhardt | 76/107.8 |

FOREIGN PATENT DOCUMENTS

| | | |
|---|---|---|
| 743783 | 10/1966 | Canada . |
| 277268 | 8/1988 | European Pat. Off. . |
| 312422 | 4/1989 | European Pat. Off. . |
| 519661 | 12/1992 | European Pat. Off. . |
| 2435331 | 4/1980 | France . |
| 1016112 | 9/1957 | Germany . |
| 3544358 | 6/1987 | Germany ............ 83/698.42 |
| 1235372 | 6/1971 | United Kingdom . |
| 1322090 | 7/1973 | United Kingdom . |
| 2133734 | 8/1984 | United Kingdom . |
| 8304004 | 11/1983 | WIPO . |

*Primary Examiner*—Rinaldi I. Rada
*Assistant Examiner*—Clark F. Dexter
*Attorney, Agent, or Firm*—Thomas R. Shaffer, Esq.

[57] ABSTRACT

In a rotary press cutter for the production of envelope blanks, a flexible foil cutting die (8) is used. The leading edge of the foil cutting die (8) is anchored against a leading face (20) of the rotary punching roller (10), and the trailing portion of the foil cutting die (8) extends without creasing over a rounded outer portion of the blade anchorage slot, to be held against the outer periphery of the punching roller (10) by magnetic attraction from inset magnet means (15). The leading edge of the foil cutting die is preformed to provide a location and anchorage flange (24) which is bent without creasing to an obtuse angle to the remainder of the foil, with a radiussed junction between the flange (24) and the remainder of the foil. A unique structure of the magnet means (15) provides very strong adhesion of the body of the foil cutting die (8) to the punching roller (10).

7 Claims, 6 Drawing Sheets

ROTARY PRESS CUTTERS

This application is a continuation-in-part of application Ser. No. 08/008,617, filed Jan. 22, 1993, now abandoned.

TECHNICAL FIELD

The invention relates to rotary press cutters for the production of envelope blanks, with or without cut-out windows, from paper material in cut sheet or continuous web form. By 'paper material' there is meant paper, thin card or fibre-reinforced thermoplastics film materials such as are commonly used in envelope manufacture. The invention also relates to novel flexible foil cutting dies for use with such envelope-making rotary press cutters.

BACKGROUND ART

Traditional rotary press cutters for envelopes have used a solid rotary cutter comprising a rigid arcuate knife on which a cutter blade is formed, so that rotation of the knife with the cutter blade formed thereon against a rotary anvil with the web of paper material trapped therebetween causes cutting of an outline in the paper material to the shape of the cutter blade. Such conventional rotary press cutters are slow to set up, and the accurate preparation of the cutters and cutter blades is a difficult and skilled task.

More recent proposals have been for the use of thin flexible foil cutting dies of the kind that have been used on label-cutting machinery. Such a flexible cutting die is formed by photographically printing onto a metal foil a chemical resist to the shape of the cutting line, and then etching away the foil for part of its thickness to expose in relief a raised cutting blade edge to the shape of the cutting line. The foil is then bent into an arc by wrapping it around the outer periphery of a rotary punching roller of an envelope cutting machine, and is secured to that rotary punching roller. The outer periphery of the punching roller may be formed by a cylindrical outer sleeve or an arcuate outer sleeve segment of the rotary punching roller of the envelope cutting machine, and the rotary punching roller with the flexible foil cutting die mounted thereon together form the rotary press cutter of the machine.

A problem exists in establishing a satisfactory method of securing the flexible foil cutting die to the outer periphery of the punching roller rapidly and accurately and immovably.

One prior proposed mounting system for a flexible foil envelope cutting die for an envelope cutting machine is disclosed in European Patent Application No. EP 312422A. The mounting system uses a rotary punching roller which has a cylindrical outer sleeve formed from two 180° half-sleeves bolted together. One of the 180° half-sleeves carries, recessed therein, an array of permanent magnets; and the flexible foil cutting die is attached to the respective 180° half-sleeve by magnetic attraction only. One embodiment disclosed in EP 312422A comprises a locating ledge or abutment projecting radially outwardly from the periphery of one of the 180° half-sleeves for locating a trailing edge of the flexible foil cutting die, but that is a locating abutment only and the teaching of EP 312422A is that the sole means of securing the flexible foil cutting die to the rotary punching roller is the attractive force of the magnets in the relevant 180° half-sleeve. This teaching is drawn in its entirety from known label-cutting machinery which uses magnets to secure flexible foil cutting dies. The magnets used in such label-cutting machinery are adequate for the task because the paper material used for self-adhesive labels is generally softer and less abrasive on the cutter blades than that used for envelopes; and on a label-cutting machine the cutter blade cuts only through half the thickness of the laminated web of label, adhesive and backing paper, so that the impact on the blades as the leading edge of the blade catches the paper web of the label sheet in the nip with the anvil is considerably less on a label-cutting machine than on an envelope machine. However tests have shown that the same magnets are not adequate for envelope cutting machines. Over time, in an envelope cutting machine the continuous pounding of the blades against the rotary anvil as in EP 312422A would cause deterioration of the magnetic strength of the isotropic magnets used, and would also cause the flexible foil cutting die to creep over the magnet surface. EP 312422A has therefore been found to be totally inadequate to meet the very high standards of accuracy required in envelope manufacture.

It will be apparent from the above discussion that the envelope cutting and label cutting arts are in fact different arts. The skilled man would know that the vastly different impact forces on the cutter blades in those two arts require mutually significantly different mounting systems to mount the cutting dies on their rotary punching rollers.

An alternative proposal for the anchorage of a flexible foil envelope cutting die on a rotary punching roller is contained in British Patent Application No. GB 2133734A. The leading and trailing edges of a flexible foil cutting die are, according to GB 2133734A, creased back on themselves to form inturned leading and trailing edge flanges of the foil, and the resulting rearwardly inclined front flange and forwardly inclined rear flange are inserted in suitably formed and angled slots in the rotary punching roller. The front edge flange is also clamped in its slot.

Disadvantages of the above proposed mounting system are that the flexible foil of the cutting die loses so much structural strength when creased that the foil tends to split or tear in use along the acute angle of the front crease. This disadvantage is exacerbated by the fact that the flexible foil cutting die is mounted under tension as it is drawn around the rotary punching roller. That tension is necessary for the accurate register of the die on the roller. However thermal expansion of the flexible foil in use tends to cause it to slacken between its anchored ends so that accurate register is lost and metal fatigue in the foil, due to constant movement, becomes a real problem.

STATEMENT OF INVENTION

It is an object of the invention to provide a rotary press cutter for an envelope cutting machine utilizing a flexible foil cutting die but with a foil anchorage means sufficient to retain the foil precisely in position on the rotary punching roller in use, without loss of structural integrity of the foil.

It is a further object of the invention to provide such a rotary press cutter, and a flexible foil die therefor, in which the operation of cutting die changing is as rapid as possible.

It is a further object of the invention to provide a method of assembly of such a rotary press cutter, and in particular a method of embedding magnets and their pole pieces in arrays in slots in the outer periphery of a rotary punching roller in the most beneficial orientation.

In the rotary press cutter of the invention the leading edge of a flexible foil cutting die is clamped without creasing on a rotary punching roller. The leading edge of the flexible foil cutting die is inturned away at an obtuse angle from the outer periphery of the punching roller, but without a sharp fold line or crease which would weaken the foil of the cutting die as described above. There is no firm anchorage of the trailing edge and therefore no tensioning of the foil, but along the whole of its length the foil is held firmly against the outer periphery of the punching roller by magnet means embedded in the outer sleeve portion of the punching roller.

The orientation and precise distribution of the magnet means adds enormously to the firmness with which the foil cutting die is held against the punching roller. The magnet means are arranged in one or more arrays embedded in longitudinal slots in the punching roller. Each array comprises a plurality of magnets oriented with like poles facing each other and with each pair of facing like poles separated by a magnetically permeable pole piece. Each array is embedded in one of the longitudinal slots, which extend parallel to a longitudinally extending central axis of the punching roller about which the punching roller rotates with the N-S orientation of the magnets in the array being aligned longitudinally or tangentially of the punching roller, as opposed to radially. In other words, the N-S orientation of the magnets, which can be defined by a line extending through the north and south pole of each magnet, are positioned to lie in a tangent plane to the outer periphery of the punching rollers. The N-S orientation of the magnets are preferably either parallel to or perpendicular to the central axis of the punching roller but must lie generally in said tangent plane.

Preferably the magnets are long narrow strips of permanently magnetic material secured in pairs in the axial slots around the periphery of outer sleeve portion of the punching roller, polarized so that their north and south poles are along the long faces of the magnetic strips and aligned longitudinally (parallel to the longitudinally extending central axis of the punching roller) so that adjacent long faces of the magnetic strips of each pair, facing the intermediate pole piece, have the same polarity.

Alternatively an array of magnets alternating with pole pieces may be placed transversely of the slots, with the magnetic axes of the magnets parallel to the axis of the punching roller (longitudinally oriented). As before, the poles of the magnets are oriented so that like poles contact opposite sides of the same pole piece. This gives a resistance to twisting and axial sliding of the foil over the surface of the punching roller nearly as strong as that described above for tangentially oriented long magnet strips. Both orientations provide significantly stronger magnetic attraction than prior proposed magnet orientations.

The above two orientations of the magnet means results in the maximum possible resistance to twisting or axial sliding of the foil over the surface of the punching roller, without actually increasing the effort needed to strip the foil cutting die away from the punching roller when blade changing. The strength with which the magnets grip the flexible foil cutting die and hold it against twisting and axial sliding is vastly increased by the above orientation of the magnet means as compared with the previously proposed magnet means of EP 312422A or of known label cutting machines. It is very important that the above increase in the magnetic holding power, particularly in the case of the tangential magnet orientation, is specifically a resistance to twisting or sliding of the foil over the surface of the punching roller, as opposed to an increase in the resistance to removing the foil by a radial stripping motion.

Preferably the magnets used in the cutter of the invention are made from an anisotropic alloy, which better resists demagnetization due to repeated impact than does an isotropic alloy.

PREFERRED EMBODIMENT

The best mode of carrying out the invention is described below with reference to the drawings, of which:

FIG. 2 is a perspective view of a rotary press cutter according to the invention suitable for mounting the cutter die of FIG. 1a;

Figures 1, 1A, 1B, 1C:
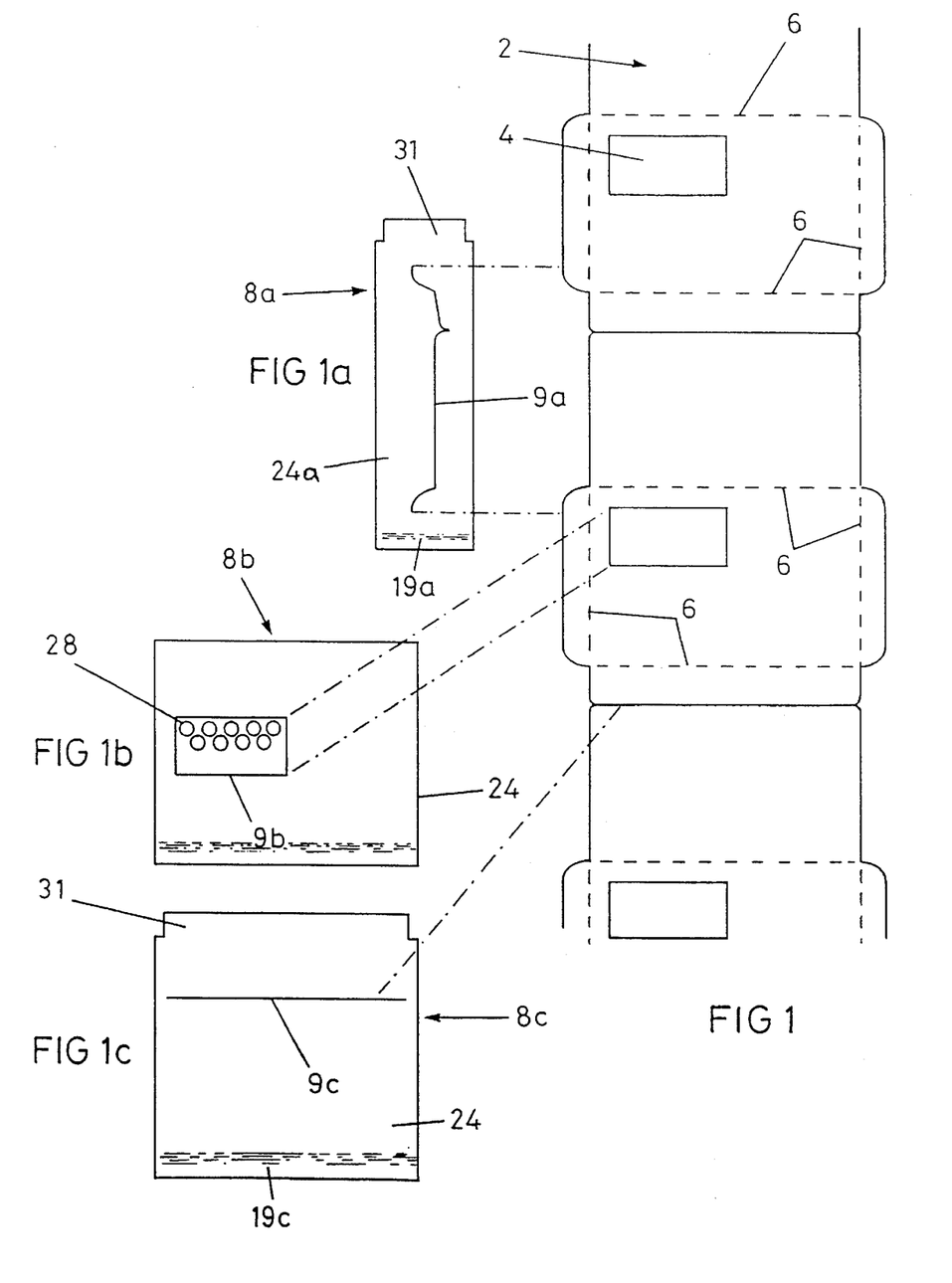
FIG. 1 is a plan view of a continuous web of paper that has been cut into a succession of envelope blanks.
FIGS. 1a to 1c, linked to FIG. 1 by chain-dotted lines, are plan views of three flexible foil cutter dies used in combination to produce the envelope blanks of FIG. 1.

Referring first to FIG. 1, there is shown a conventional outline of a series of envelope blanks 2 cut from a continuous web of paper. A window 4 has been cut from each blank 2. Shown in broken lines at 6 are the four fold lines which ultimately are used to create window envelopes from the blanks 2, from which the reader will be able to comprehend how the envelopes are made up from the blanks.

The envelope blanks 2 of FIG. 1 would conventionally be formed from a succession of four consecutive cutting operations on a rotary cutter envelope cutting machine. The cutting operations would involve two profile cutters, also known as side knives; one window cutter, also known as a panel cutter or panel knife; and one cross-cut knife, also known as a separating knife (not necessarily operating on the paper web in that sequence).

FIGS. 1a to 1c illustrate the shapes of the knife forms 9a, 9b and 9c respectively of one of the pair of profile cutters 8a (FIG. 1a) (the other of the pair being a mirror image); the window cutter 8b (FIG. 1b) and the cross-cut knife 8c (FIG. 1c). Each of the cutters of FIGS. 1a to 1c is a flexible metal foil cutting die in which the knife form 9a, 9b or 9c has been formed on a flexible foil backing 24 by chemical etching or electrochemical machining. The foil cutting dies are mounted on rotary punching rollers of envelope cutting machinery as follows.

Figure 1D:
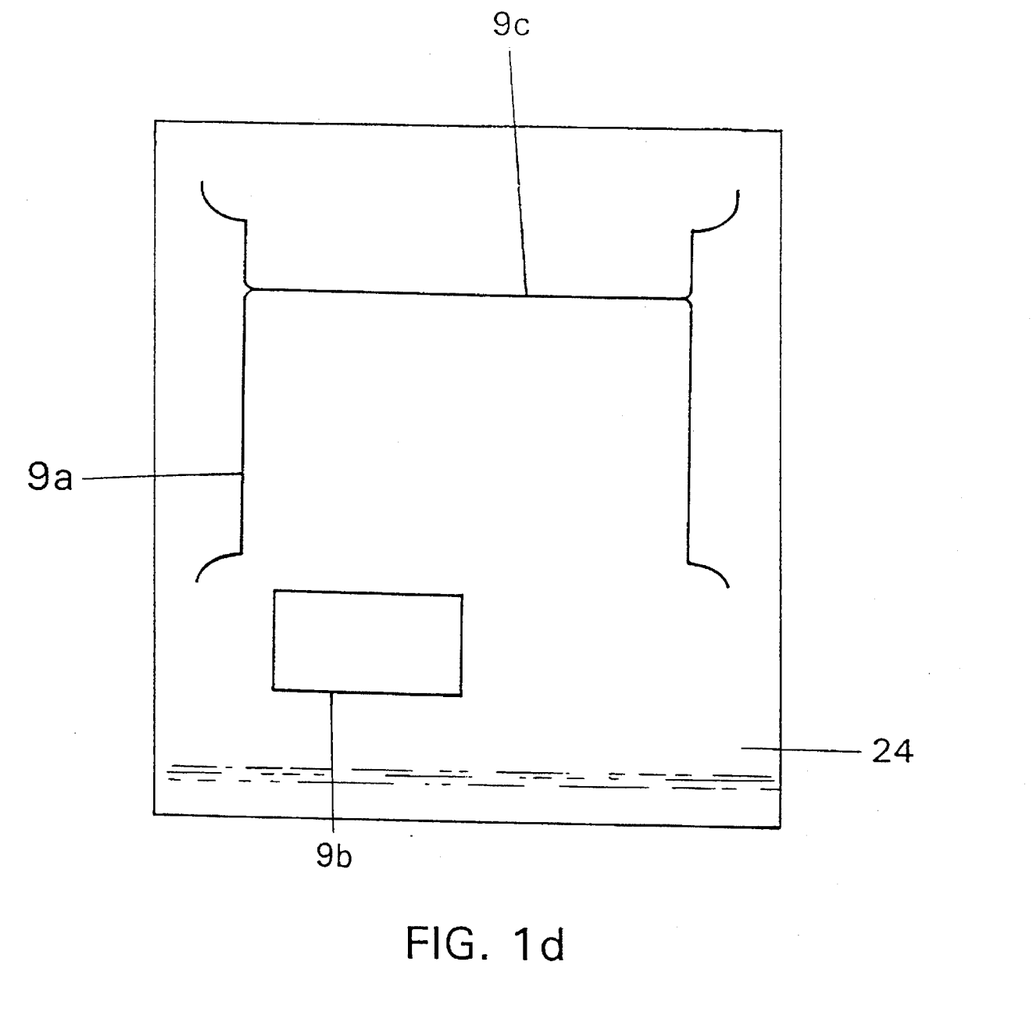
FIG. 1d is a plan view of a flexible foil cutting die which has formed thereon a combination of knife edge forms resulting in a combination of profile window and cross-cut knife cutters which produce, from a single pass, the envelope blanks of FIG. 1.

FIG. 1d illustrates a single flexible foil cutting die which has formed thereon a combination of knife edge forms 9a, 9b and 9c resulting in a combination of profile 9a, window 9b and cross-cut 9c knife cutters which produce, from a single pass, the envelope blanks of FIG. 1.

Figure 2:
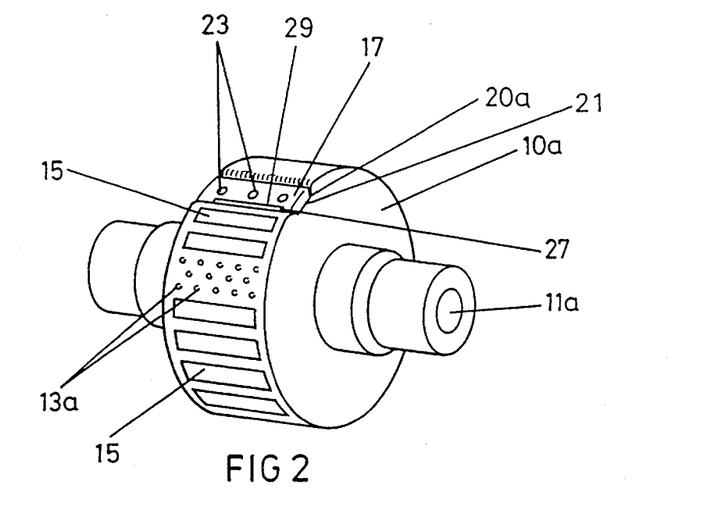

The cutting dies of the profile cutters 8a are mounted on a punching roller 10a of FIG. 2. The punching roller 10a includes a conventional axial vacuum control bore 11a in communication with radial vacuum ports 13a which in use collect the cut waste pieces of edge trimmed paper and transport that cut waste to a delivery point angularly displaced from the cutting zone. On either side of the vacuum ports 13a is provided an annular array of inset permanent magnet means 15 which will be more fully described later. A trailing edge of a wedge bar 17 clamps the leading edge flange 19a (FIG. 1a) of the foil of the profile cutter 8a against a leading face 20a of a wedge recess 21 in the rotary body of the punching roller 10a. The wedge bar 17 is clamped in place by a row of clamping screws 23.

The leading edge of the wedge bar 17 is stepped at 27 so that a central portion is spaced apart from the leading edge of the wedge recess 21. The resulting gap 29 receives a trailing edge 31 of the flexible foil 24a of the cutting die 8a (see FIG. 1a) with the stepped portions 27 of the wedge bar 17 providing lateral support for the trailing edge 31 of the foil 24a.

It is important that the anchorage of the trailing edge 31 of the foil cutting die 8a should permit sliding of the foil circumferentially around the periphery of the punching roller 10a whilst resisting lateral sliding. To that end a magnetic bar (not shown in the drawings) is inset into wedge bar 17 along its leading edge, projecting into the gap 29. There is a freedom of movement of about 1 mm to the magnetic bar, so that it is attracted by and clamps against the leading edge face of the wedge recess 21. When the foil 24a has its leading edge flange 19a clamped between the trailing edge of the wedge bar 17 and the trailing face of the wedge recess 21, the foil is held magnetically against the periphery of the punching roller 10a with the trailing edge 31 of the foil received in the gap 29 and lightly clamped by the free floating magnet in the gap 29. If the foil 24a were to stretch in use due to thermal expansion, the trailing edge 31 would slide further into the gap 29 despite the light clamping effect of the free floating magnet; and similarly if it were to contract there would be permitted sliding.

The shape of the wedge recess 21 is important. The leading and trailing faces of the wedge recess 21 are both inclined at an obtuse angle to the outer periphery of the punching roller 10a but are rounded at the respective edge junctions between the side faces and the outer periphery. The foil 24a of the cutting die 8a is similarly shaped at its leading edge. The leading edge flange 19a is bent over at an obtuse angle to the remainder of the foil, with the bend between the bent-over flange portion 19a and the remainder of the foil 24a being radiussed, preferably to a 2 mm radius. Therefore when the leading edge flange 19a of the foil cutting die 8a is clamped by the wedge bar 17 against the trailing face 20a of the wedge recess 21, the face 20a accurately locates the foil and the preformed leading edge flange 19a and the radiussed portion of the foil 24a accurately conforms to the shape of the face 20a and to the rounded edge of the recess 21, while the remainder of the foil 24a is magnetically held against the punching roller and the trailing end of the foil is lightly clamped against the opposite face of the wedge recess 21. There is no fold line or crease line in the foil 24a, and therefore no zone of weakness to give a potential tear zone in use.

Figure 8:
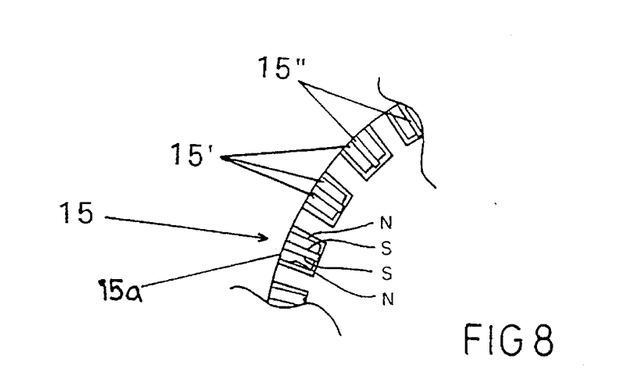
FIG. 8 is an enlarged detail of the magnet alignment of FIG. 3.

The permanent magnet means 15 which hold the foil 24a against the outer periphery of the punching roller 10a are inset into longitudinal slots in the punching roller 10a. The magnet means 15 comprise arrays of magnets 15' arranged with like poles in abutment with opposite sides of permeable pole pieces 15" as illustrated in greater detail in FIGS. 8 and 9. This results in a strong magnetic flux close to the surface of the outer periphery of the punching roller 10a, securely to hold the foil 24a in position, resisting sliding of the foil 24a over the outer periphery of the punching roller.

Figure 9:
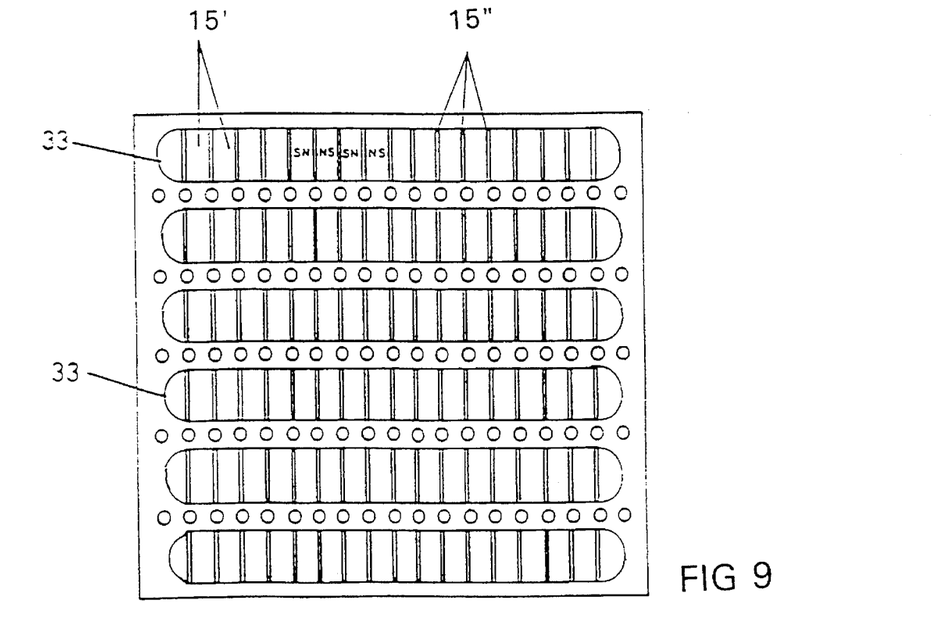
FIG. 9 is a developed plan view, over the angular extent A of FIG. 5, of one of the arcuate outer sleeve segments 14 of FIG. 3 but with the magnets aligned longitudinally as opposed to tangentially.
Figure 10:
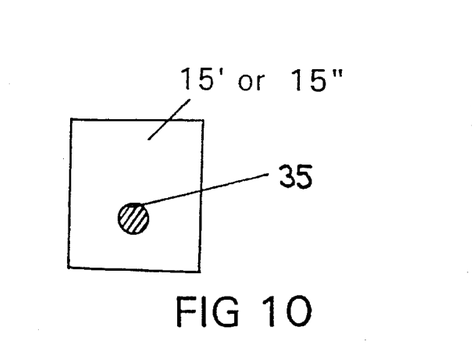
FIG. 10 is a plan view of a magnet or a pole piece as used in FIG. 9, threaded onto a brass rod.

The method of assembly of the magnet means of FIG. 9 is as follows. A series of magnets 15' and pole pieces 15", each of a shape as shown in FIG. 10, is threaded onto a brass rod 35. The magnets 15' are threaded with like poles facing each other on opposite sides of the intermediate pole pieces 15". A magnetically permeable keeper in the form of a bar of soft steel (not shown in the drawings) is placed over the top edges 15a of the magnets 15' and pole pieces 15". The keeper is attracted to the magnets and provides a magnetic flux path which actually causes the magnets 15' to be drawn against the pole pieces 15" by magnetic attraction, despite the fact that without the keeper the adjacent like poles of the magnets would repel each other.

The assembly of magnets 15' and pole pieces 15" on the brass rod 35, with the keeper in place, is then placed in the appropriate slot in the punching roller 10a, and cemented in place with a thermosetting resin 33. The keeper lies outside of the slot. When all slots have been filled in this way, the keepers are removed and any surface resin is removed by grinding.

Figure 5:
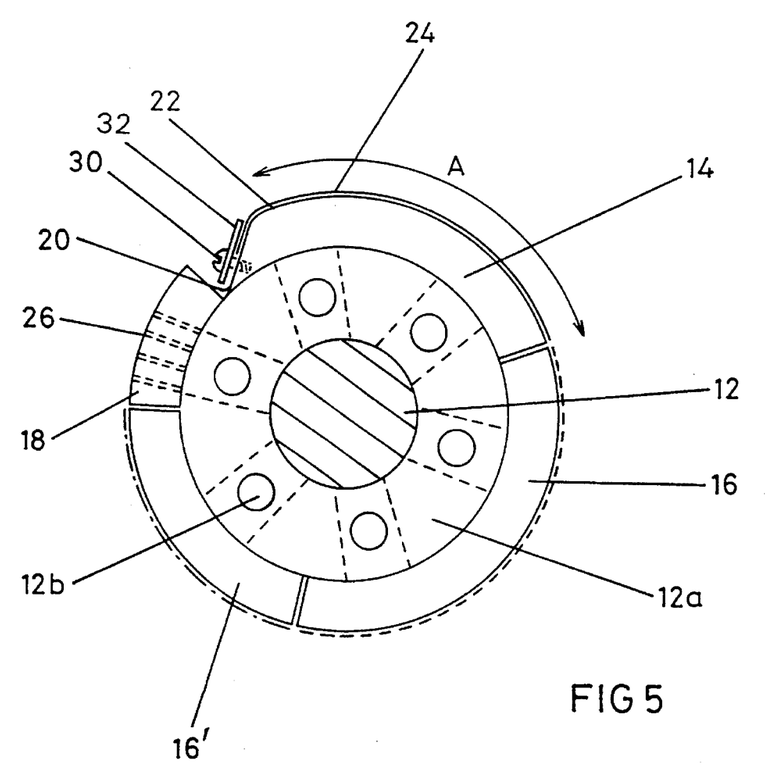
FIG. 5 is an end elevation of the rotary press cutter of FIG. 3.

FIGS. 1b, 3, 5, 6 and 7 illustrate the slightly different construction of a window cutter 8b and its associated punching roller 10b. Although the detail of construction differs, the principle of foil anchorage is the same as that already described. The knife form 9b of the window knife cutting die is shown in FIG. 1b as rectangular, although any suitable rectilinear or curvilinear shape may be chosen. For example, as shown in FIG. 5, leading edge flange 19b of the foil is performed to a shape in which it is bent over at an obtuse angle to the remainder of the foil 24b. Such bend is radiussed as shown at 19r to conform to inclined leading face 20. The shape is thus the same as that of the leading edge flange 19a of the foil 24a described earlier.

Figure 3:
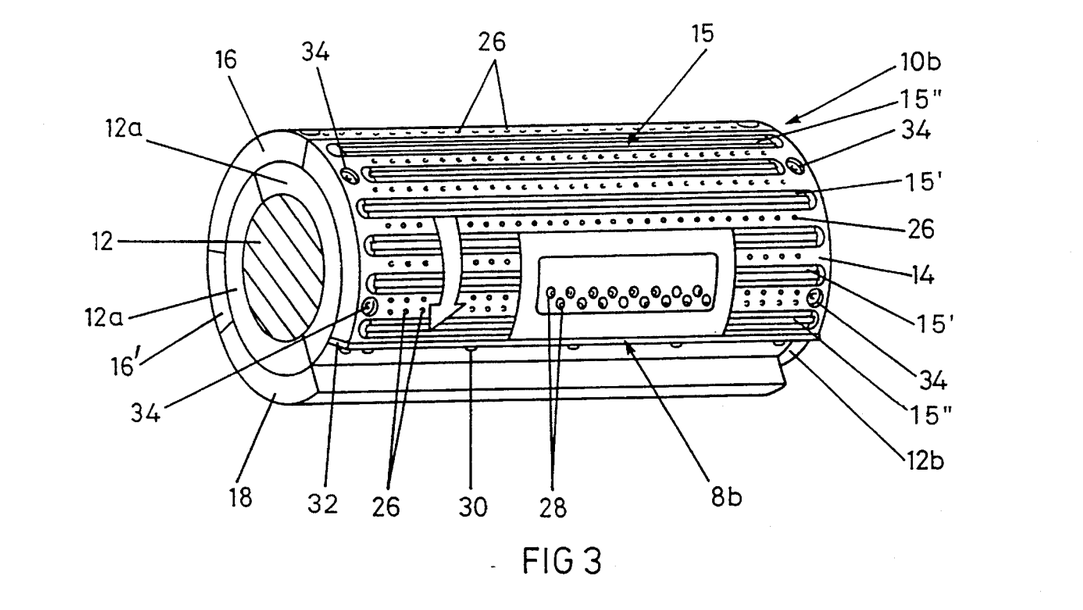
FIG. 3 is a perspective view of a rotary press cutter according to the invention suitable for mounting the cutter die of FIG. 1b.

The punching roller 10b (FIGS. 3 and 5) comprises a main driven shaft 12 on which is mounted a vacuum sleeve 12a which is formed in two 180° segments. At the right-hand side of the vacuum sleeve 12a as illustrated in FIG. 3 is a vacuum manifold 12b through which vacuum or air can be applied at selected angular stages in the rotation of the roller 10b. The shaft 12, sleeve 12a and manifold 12b are standard parts of a commercially available window forming punching roller 10b. The punching roller 10b is rotatable around a longitudinally extending central axis 36 (FIG. 5).

Bolted to the outer periphery of the sleeve 12a are segmented sleeve elements 14, 16 and 16' and a vacuum-transfer bar 18. The vacuum transfer bar 18 is conventional in a commercially available window forming punching roller 10b, and is formed with an array of vacuum holes 26 (FIG. 5) for the selective application of vacuum to suck and hold the paper passing through the machine. Each of the sleeve elements 14 and 16 circumscribes nearly an arc of substantially 120° around the spindle, and the sleeve element 16' and vacuum transfer bar 18 together circumscribe a further 120° so that the three elements 14, 16 and 16' and the vacuum transfer bar 18 together form a substantially complete outer sleeve of the punching roller 10b.

The three sleeve elements 14, 16 and 16' are not identical. As illustrated, only one (sleeve element 14) is formed with a leading face 20 (FIG. 5) that is cut back to form an obtuse angle with its outer periphery 22, and is rounded at its junction with the outer periphery 22, so that when the flexible foil 24*b* of the cutting die 8*b* overlies the leading face 20 and the outer periphery 22 there is no sharp acute-angled crease formed in the foil of the cutter blade. The leading edge of the flexible foil cutting die 8*b* is clamped to the inclined leading face 20 as will be described later below.

Although not illustrated in the drawings, the rotary press cutter of the invention may comprise two or even three sleeve elements 14, each mounting its own cutting die 8*b* with the leading edge of each cutting die 8*b* clamped to the inclined leading face 20 of its associated sleeve element 14. FIG. 3 shows how a small window cutting die 8*b* may be mounted to extend over only part of the surface of the sleeve element 14. Alternatively, a larger foil cutting die 8*b* as illustrated in FIG. 1*b* may extend over a larger part or the whole of the sleeve element 14, extending the flexible design concept further.

A single foil 24*b* may extend over two adjacent sleeve elements 14 and 16 (as indicated in solid line and broken line in FIG. 5) or may extend over all three sleeve elements 14, 16 and 16' (as indicated in solid line, broken line and chain-dotted line in FIG. 5).

Each sleeve element 14, 16 and 16' incorporates apertures 26 (FIG. 3) intended to cooperate with air holes 28 in the cutting dies 8*b*, and with vacuum ports in the vacuum sleeve 12*a* for controlling the air supply as the punching roller 10*b* rotates. Thus when the spindle 12 rotates, air is alternately sucked and blown through the air holes 28 in the cutter blades in synchronism with the spindle rotation, so that different cut portions of the paper material are selectively either carried around on the rotating punching roller 10*b* or ejected therefrom. FIGS. 3, 6, 7 and 9 show rows of air holes 26 between each adjacent pair of magnets 15, but that is not necessary and a more selective distribution of air holes may be chosen.

The anchorage of the flexible foil 24*b* of the cutting die 8*b* on the punching roller 10*b* is as follows. A leading edge of the cutter blade foil 24*b* is bent without creasing to an obtuse angle to the remainder of the foil, and is clamped by a clamping bar 32 against the inclined leading face 20 of the sleeve element 14 by means of screws 30. The junction between the bent-over flange of the foil leading edge and the remainder of the foil 24*b* is radiussed to conform to a rounded junction between the leading face 20 and the outer periphery of the sleeve element 14. The remainder of the foil 24*b* is held against the outer periphery of the punching roller 10*b* by the attractive force of permanent magnet means 15 inset into the sleeve elements 14, 16 and 16'.

Figure 6:
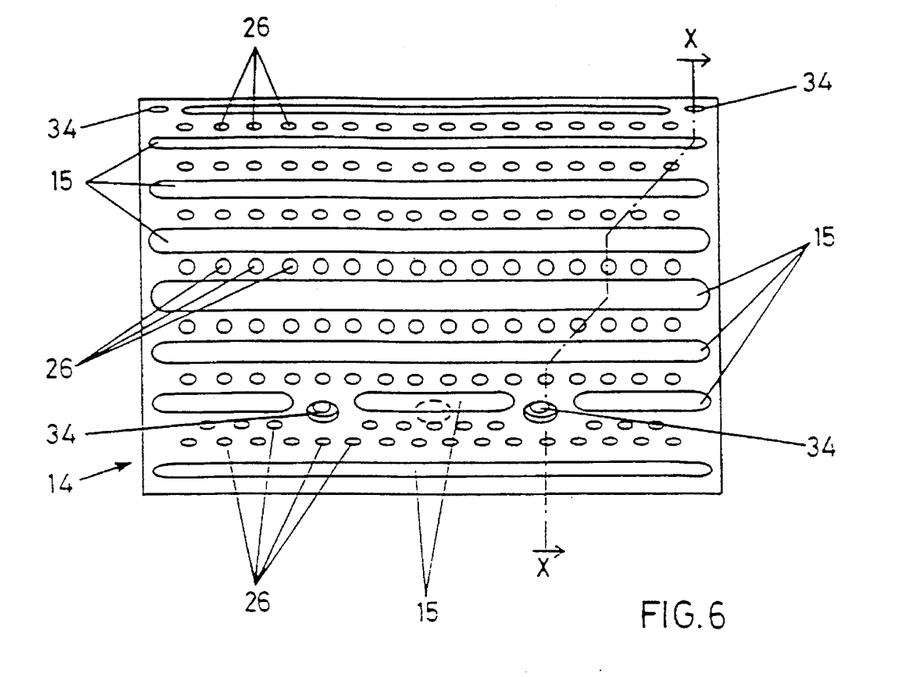
FIG. 6 is a plan view of one of the arcuate outer sleeve segments 14 of FIG. 3.
Figure 7:
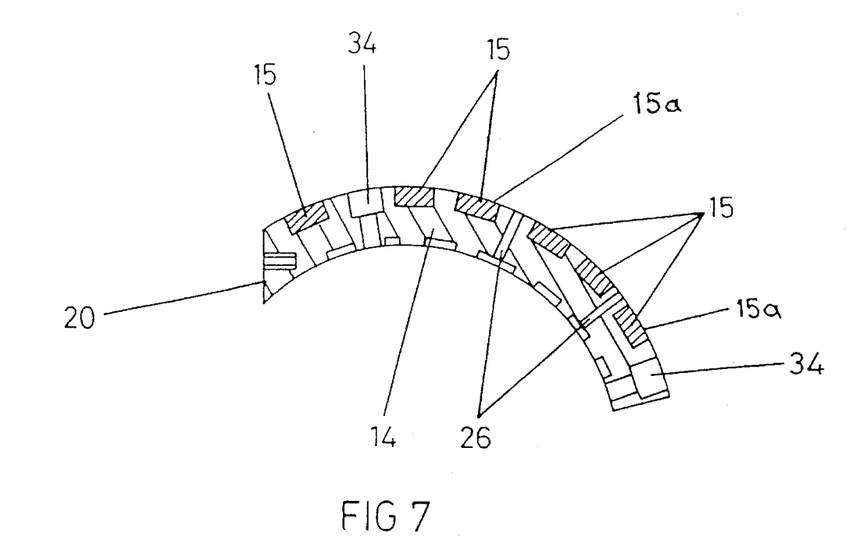
FIG. 7 is a staggered section through the arcuate outer sleeve segment of FIG. 6 taken along the line X—X.

The general orientation of the magnet means 15 is shown in FIG. 6, and the orientation and polarization of the magnets 15' and pole pieces 15" within the slots is similar to that described above with reference to FIGS. 2 and 8 or 2 and 9.

FIG. 6 differs from FIG. 3 in that it shows a different array of bolt holes 34 through which are passed fixing bolts for bolting the sleeve element 14 onto the vacuum sleeve 12*a*. In FIG. 3 the four bolt holes 34 are at the four corners of the sleeve element 14, whereas in FIG. 6 two are displaced towards the center. The difference is merely to illustrate the flexibility of the design.

FIG. 1*c* illustrates the separating knife 8*c* which is also formed as a flexible foil cutting die. It is mounted on a punching roller 10*c* (FIG. 4) in a manner analogous to the mounting of the profile cutters 8*a* except that the anchorage of the trailing end 31 of the foil between shoulders 27 of the wedge bar 17 is optional since there is much less need for lateral support of the foil in the case of a separating knife. The knife form may be straight, as illustrated, or may be V-shaped to form a triangular flap.

Figure 4:
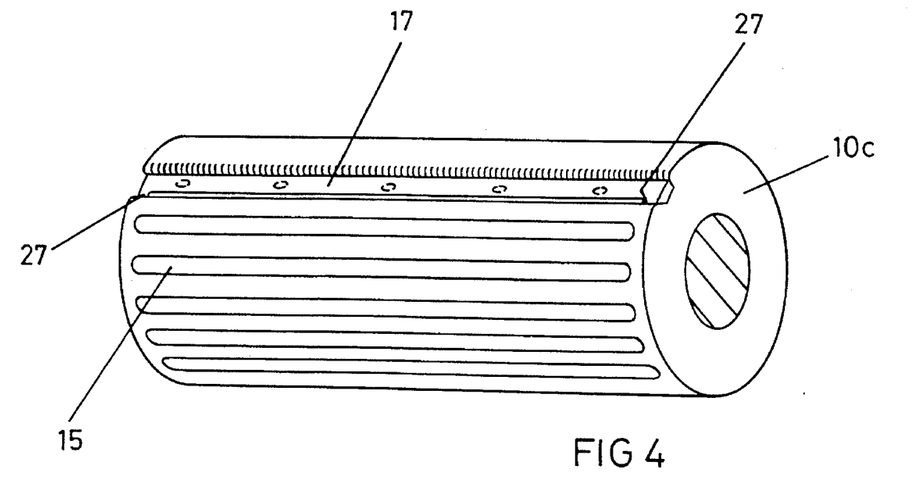
FIG. 4 is a perspective view of a rotary press cutter according to the invention suitable for mounting the cutter die of FIG. 1c.

There are no vacuum ports in the rotary punching roller 10*c* illustrated in FIG. 4 for the separating knife 8*c*.

In use, the timing of the punching rollers 10*a*, 10*b* and 10*c* has to be carefully controlled so as to bring the three cutting dies or sets of cutting dies into contact with the paper at the correct instant so as to cooperate together to provide the continuous stream of envelope blanks illustrated in FIG. 1. The rotation of the punching die 10*c* carrying the separating knife is pull length dependent since every complete revolution of the punching die causes the cross-cut which defines the length of the envelope blank. The other two rotating punching rollers are in practice geared to the rotation of that separating roller 10*c*.

The secure anchorage of the flexible foil cutting dies on the rotating punching rollers makes it possible according to the invention for all knife profiles (that is to say, for edge profiles, window formation and blank separation) to be formed on a single flexible foil cutting die (FIG. 1*d*) which in practice would be mounted on a rotating punching roller entirely analogous to that of FIGS. 3 and 5.

I claim:

1. A rotary press cutter for the production of envelope blanks, comprising:
    (a) a rotatable punching roller having a longitudinal blade anchorage face formed inwardly of its outer periphery, said punching roller rotatable around a longitudinally extending central axis;
    (b) a flexible foil cutting die removably secured to said outer periphery of said punching roller, said flexible cutting die further comprising;
        (i) a flexible body portion of magnetically permeable material;
        (ii) at least one integral knife edge formed to a predetermined cutting shape, and upstanding from said body portion; and
        (iii) an integral leading edge flange which is connected to said body portion by a radiussed portion and is preformed at an obtuse angle to said body portion;
    (c) clamping means, associated with the blade anchorage face of said punching roller, for releasably clamping said leading edge flange only of said flexible foil cutting die against said anchorage face without creasing said flexible foil with said radiussed portion of said flexible foil cutting die overlying a complementary curved edge zone of said punching roller between its anchorage face and its outer periphery; and
    (d) magnet means embedded in longitudinal slots in the outer periphery of the punching roller for releasably holding said body portion of said flexible foil cutting die against said outer periphery of said punching roller by magnetic attraction, said magnet means further comprising a plurality of permanent magnets embedded and secured in each slot with like poles facing one another and with each pair of facing like poles separated by a magnetically permeable pole piece, each of said magnets having a N-S orientation which is co-linear with a straight line passing through the north and south pole of such magnet, wherein at least one of said straight lines extends along an outer side of each of the embedded plurality of permanent magnets and lies in a plane which is tangent to the outer periphery of the punching roller.

2. A rotary press cutter according to claim 1, wherein each magnet has poles which extend generally parallel to said central axis and longitudinally in the respective longitudinal slot in the outer periphery of the punching roller, with the N-S magnetic orientation being generally perpendicular to said central axis of the punching roller.

3. A rotary press cutter according to claim 2, wherein each longitudinal slot has two such magnets secured therein, each of said magnets being in the form of an elongated strip and arranged one on each side of a pole piece.

4. A rotary press cutter according to claim 1, wherein the N-S magnetic orientation of the magnets is generally parallel to the central axis of the punching roller.

5. A rotary press cutter according to claim 4, wherein each of the magnets and each of the pole pieces is formed with a locating through hole, and a locating brass rod extends through the through holes of each of the magnets and pole pieces positioned within each of the longitudinal slots.

6. A rotary press cutter according to claim 1, wherein the magnets are made from an anisotropic alloy.

7. A rotary press cutter according to claim 1, wherein said flexible foil further comprises a trailing edge portion which, in its unstressed rest condition, lies co-planar with the remainder of the flexible body portion.

* * * * *